US011923916B2

(12) United States Patent
Smith et al.

(10) Patent No.: US 11,923,916 B2
(45) Date of Patent: Mar. 5, 2024

(54) SYSTEM FOR PROVIDING POWER TO AND COMMUNICATION CAPABILITIES WITH A ROTATING CIRCUIT BOARD

(71) Applicant: NUSTEP, LLC, Ann Arbor, MI (US)

(72) Inventors: Richard T. Smith, Milan, MI (US); Daniel C. Shnidman, Ann Arbor, MI (US); Kevin G. Obrigkeit, Plymouth, MI (US); Neil M. Cole, Grass Lake, MI (US); Nathan V. Goslee, Saline, MI (US)

(73) Assignee: NUSTEP, LLC, Ann Arbor, MI (US)

( * ) Notice: Subject to any disclaimer, the term of this patent is extended or adjusted under 35 U.S.C. 154(b) by 268 days.

(21) Appl. No.: 17/161,021

(22) Filed: Jan. 28, 2021

(65) Prior Publication Data
US 2022/0239336 A1  Jul. 28, 2022

(51) Int. Cl.
*H04B 5/00* (2006.01)
*H02J 50/10* (2016.01)
*A63B 22/00* (2006.01)
*A63B 24/00* (2006.01)
*A63B 22/06* (2006.01)

(52) U.S. Cl.
CPC ....... *H04B 5/0037* (2013.01); *A63B 22/0005* (2015.10); *A63B 24/0062* (2013.01); *H02J 50/10* (2016.02); *H04B 5/0075* (2013.01); *A63B 2022/0635* (2013.01); *A63B 2220/13* (2013.01); *A63B 2220/40* (2013.01); *A63B 2220/51* (2013.01); *A63B 2220/833* (2013.01)

(58) Field of Classification Search
CPC ..... H04B 5/0037; H04B 5/0075; H02J 50/10; H02J 50/12; A63B 2208/0233; A63B 22/0005; A63B 24/0062; A63B 2022/0635; A63B 2220/13; A63B 2220/40; A63B 2220/51; A63B 2220/833; A63B 22/0605; A63B 2220/16; A63B 2225/50; A63B 2230/06; A63B 2230/207; A63B 2230/50; A63B 21/0051; H01F 27/2804; H01F 38/18; H01F 27/24; H01F 38/14; G01D 5/2053; G01D 5/205; G01D 5/206; G01D 5/2066; G01D 5/145; G01L 3/105

See application file for complete search history.

(56) References Cited

U.S. PATENT DOCUMENTS

| 10,260,971 | B2 | 4/2019 | Hamel et al. | |
|---|---|---|---|---|
| 10,969,247 | B2* | 4/2021 | Zabulon | G01D 5/206 |
| 2012/0223700 | A1* | 9/2012 | Shao | G01L 3/105 |
| | | | | 324/207.16 |
| 2015/0115762 | A1* | 4/2015 | Rozman | H01F 38/18 |
| | | | | 336/123 |

(Continued)

FOREIGN PATENT DOCUMENTS

GB           1510126 A       5/1978

*Primary Examiner* — Angelica Perez
(74) *Attorney, Agent, or Firm* — Darrow Mustafa PC (57) ABSTRACT

A system for transmitting power and data between two circuit boards may include a fixed circuit board having a primary coil and a rotatable circuit board having a secondary coil. The system may further include a sensor in communication with the secondary coil of the rotatable circuit board. The fixed circuit board's primary coil may be inductively coupled to the secondary coil and may provide power and receive data from the sensor when inductively coupled to the secondary coil.

20 Claims, 5 Drawing Sheets

(56) References Cited

U.S. PATENT DOCUMENTS

2017/0279309 A1* 9/2017 Lee ...................... B60L 53/126
2019/0331541 A1* 10/2019 Janisch ................ G01D 5/2053
2019/0341183 A1* 11/2019 Petkov ................ H01F 27/2804

* cited by examiner

SYSTEM FOR PROVIDING POWER TO AND COMMUNICATION CAPABILITIES WITH A ROTATING CIRCUIT BOARD

TECHNICAL FIELD

The subject matter described herein relates, in general, to a system for providing communication and power capabilities to a rotating circuit board from a fixed circuit board.

BACKGROUND

The background description provided is to present the context of the disclosure generally. Work of the inventor, to the extent it may be described in this background section, and aspects of the description that may not otherwise qualify as prior art at the time of filing, are neither expressly nor impliedly admitted as prior art against the present technology.

Sensors may be mounted on one or more structures that are configured to rotate. In some cases, the structure may be a movable element of an exercise machine, such as foot pedals or handlebars. Sensors can be incorporated within these movable elements to collect information regarding a user's interaction with these movable elements.

However, sensors attached to these movable elements must be provided power and need to communicate data they have collected to another system so that the data can be evaluated. Due to the rotational nature of the structure that the sensor is attached to, it may not be possible to provide a wired connection with power and communication capabilities. For example, because the structure may be rotating, wires connected to the sensors to provide power and/or communication capabilities may become tangled, crimped, severed, or may otherwise impact the freedom of movement of the structure.

As a solution, some sensors may be powered by batteries mounted near the sensor. Additionally, with regards to providing data to another system, some sensors utilize a wireless transmitter to transmit data they have collected. This type of solution avoids any issues with using a wired connection mentioned above. However, this type of solution has drawbacks in that batteries become depleted over time and need to be recharged and/or replaced. Additionally, these batteries add bulk to the structure, potentially negatively impacting the movement of the structure. Further still, wireless transmitters may be subject to interference and may not consistently transmit data collected from a sensor.

SUMMARY

This section generally summarizes the disclosure and is not a comprehensive explanation of its full scope or all its features.

In one example, a system for providing communication and power capabilities to a rotating circuit board from a fixed circuit board may include a fixed circuit board having a primary coil, a rotatable circuit board having a secondary coil, and an axle extending through the fixed circuit board and the rotatable circuit board. The axle may be connected to the rotatable circuit board, which rotates about an axis defined by the axle when the axle rotates. The system may further include a sensor in communication with the secondary coil of the rotatable circuit board. The fixed circuit board's primary coil may be inductively coupled to the secondary coil and may provide power and receive data from the sensor when inductively coupled to the secondary coil.

In another example, a system for providing communication and power capabilities to a rotating circuit board from a fixed circuit board may include a fixed circuit board having a primary coil and a rotatable circuit board having a secondary coil. The rotatable circuit board may have a circular perimeter, wherein a portion of the secondary coil is embedded within the rotatable circuit board and is adjacent to the circular perimeter. The system may further include a sensor in communication with the secondary coil of the rotatable circuit board. The fixed circuit board's primary coil may be inductively coupled to the secondary coil and may provide power to and receive data from the sensor when inductively coupled to the secondary coil, even when the rotating circuit board is rotating. As such, power can be provided to electronics that are located on or electrically connected to the rotating circuit board without batteries or wiring from a power source.

Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements, or multiple elements may be designed as one element. In some embodiments, an element shown as an internal component of another element may be implemented as an external component and vice versa. Furthermore, elements may not be drawn to scale.

DETAILED DESCRIPTION

In one example, a system for providing communication and power capabilities to a rotating circuit board may be implemented within an upper body ergometer. The upper body ergometer may utilize one or more assemblies that are actuated by a user. These assemblies may rotate about an axis that is defined by an axle. The system for providing communication and power capabilities to a rotating circuit board may include a rotating circuit board and a fixed circuit board. The axle may extend through the rotating circuit board and the fixed circuit board. The rotating circuit board may be connected to the axle so that it rotates when the axle rotates. However, the fixed circuit board is not connected to the axle and stays in a fixed position when the rotating circuit board rotates.

The rotating circuit board may include a secondary coil located near the perimeter of the rotating circuit board. The fixed circuit board may include a primary coil located near a perimeter of the primary circuit board. Generally, the perimeters of the rotating circuit board and the fixed circuit board may be substantially circular in shape and have a similar curvature. The rotating circuit board and the fixed circuit board may be located adjacent to each other such that the primary coil of the fixed circuit board and the secondary coil of the rotating circuit board can be inductively coupled to each other. As such, the rotating circuit board can receive power from the fixed circuit board and communicate with the fixed circuit board using inductive coupling, without the need for a wired connection between the two.

Figure 1:
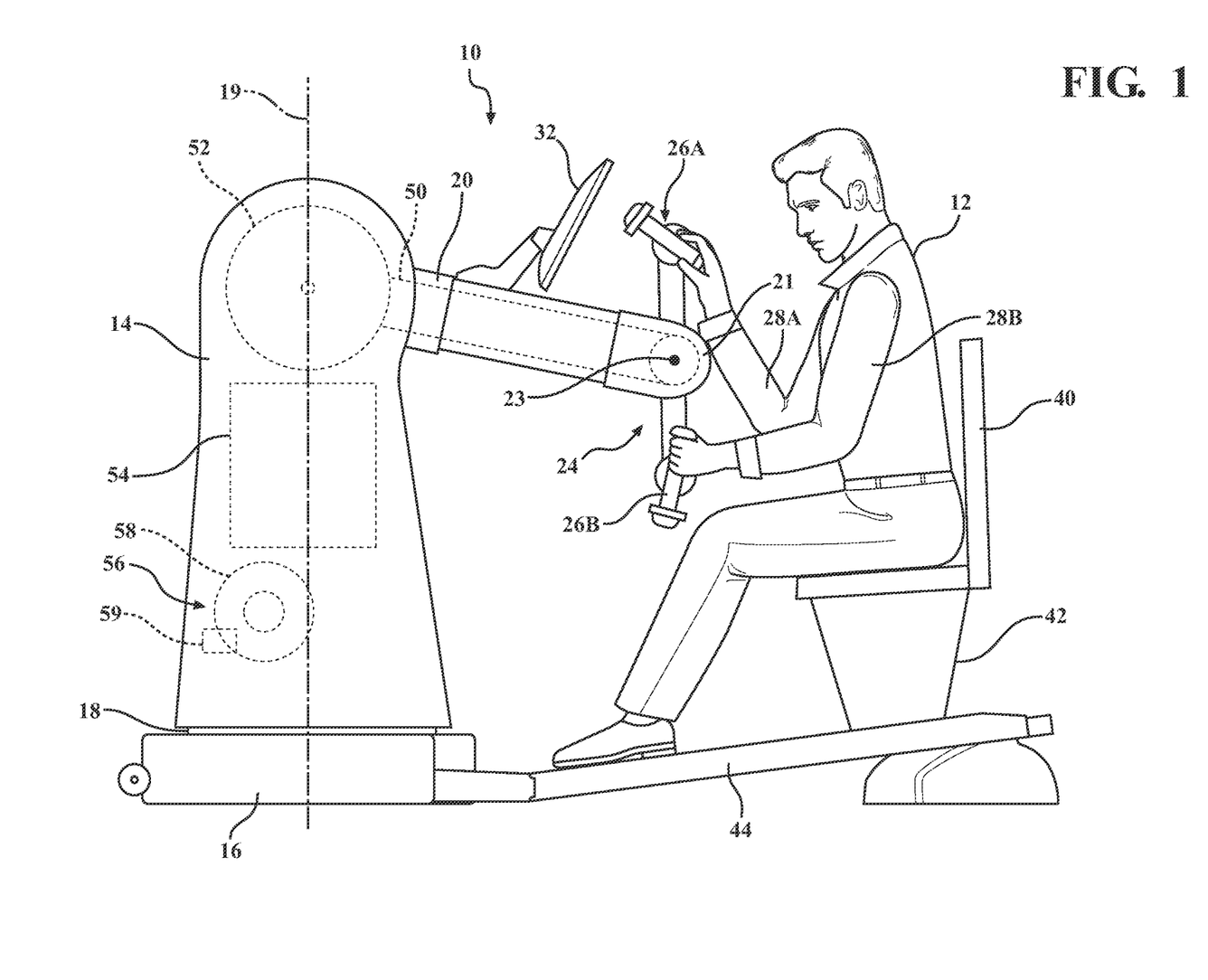
FIG. 1 illustrates an upper body ergometer that utilizes a system for providing communication and power capabilities to a rotating circuit board.

Referring to FIG. 1, illustrated is an upper body ergometer 10 being utilized by a user 12. The upper body ergometer 10 includes a body structure 14 that is attached to a base 16. The body structure 14 may be coupled to the base 16 by a rotatable docking mechanism 18 that operates in two modes. In a first mode, the rotatable docking mechanism 18 allows the body structure 14 to rotate about an axis 19 that generally extends along the length of the body structure 14. In a second mode, the rotatable docking mechanism 18 locks the body structure 14 into place and prevents the rotation about the axis 19. As will be explained later in this specification, the rotatable docking mechanism 18 allows the body structure 14 to rotate away from a seat 40 so that users that do not wish to use the seat 40 or are utilizing another type of seat, such as a wheelchair, can utilize the upper body ergometer 10.

The upper body ergometer 10 includes a control assembly 20 that extends away from the body structure 14 and towards the user 12. The control assembly 20 may be pivotally connected to the body structure 14 and can selectively pivot upwards or downwards based on the preference of the user 12. Located at an end 21 of the control assembly 20, opposite of the body structure 14, is an upper-body assembly 24. The upper-body assembly 24 includes a first crank arm assembly 26A and a second crank arm assembly 26B. The first crank arm assembly 26A and the second crank arm assembly 26B generally rotate about an axis 23. Here, the arms 28A and 28B of the user 12 engage the first crank arm assembly 26A and the second crank arm assembly 26B, respectively. The first crank arm assembly 26A and the second crank arm assembly 26B may rotate in either direction depending on how the user 12 engages the first crank arm assembly 26A and the second crank arm assembly 26B.

As the user 12 actuates the first crank arm assembly 26A and the second crank arm assembly 26B, a chain 50 is moved. The chain 50 is generally located within the control assembly 20. The chain 50 is in mechanical communication with one or more flywheels 52 that may be in mechanical communication with transmission mechanisms 54. The transmission mechanisms 54 may be in turn in mechanical communication with a resistance mechanism 56. The resistance mechanism 56 may be an eddy current brake that includes an eddy current disc 58 and a magnet 59. The resistance mechanism 56 may be adjusted by the user 12 by interacting with a touchscreen 32 that can adjust the resistance mechanism 56 to increase or decrease the resistance experienced by the user 12 when engaging the first crank arm assembly 26A and the second crank arm assembly 26B.

It should be understood that the mechanism for providing resistance to the user 12 when engaging the first crank arm assembly 26A and the second crank arm assembly 26B can take any one of several different forms and do not necessarily need to include all the mechanical components and resistance mechanisms described in the paragraph above. In some cases, the resistance mechanism and associated powertrain may be more complex as described. However, more simplistic resistance mechanisms may also be utilized. Additionally, for example, instead of utilizing a chain, a belt or some other mechanical connection methodology may be utilized. The same is also true for the resistance mechanism 56. Instead of using an eddy current brake, some other type of resistance mechanism could be utilized.

In this example, the user 12 is seated on a seat 40 that includes a base 42. A track 44, which may be connected to the base 16, may be configured such that the base 42 may slidably engage the track 44. The base 42 may include a locking device that allows the base 42, and therefore the seat 40, to selectively slide/lock along the length of the track 44. Additionally, it should be understood that the base 42, and therefore the seat 40, may be removed from the track 44 to allow a user to engage the first crank arm assembly 26A and the second crank arm assembly 26B while standing or if the user 12 is utilizing another type of chair, such as a wheelchair.

Additionally, as stated previously, in situations where the user 12 wishes to stand or is utilizing a wheelchair, the body structure 14 may be rotated away from the seat 40 using the rotatable docking mechanism 18. For example, the user 12 can simply rotate the body structure 14 such that the first crank arm assembly 26A and the second crank arm assembly 26B are more conveniently located for engagement when standing or using a different type of chair, such as a wheelchair.

Figure 2:
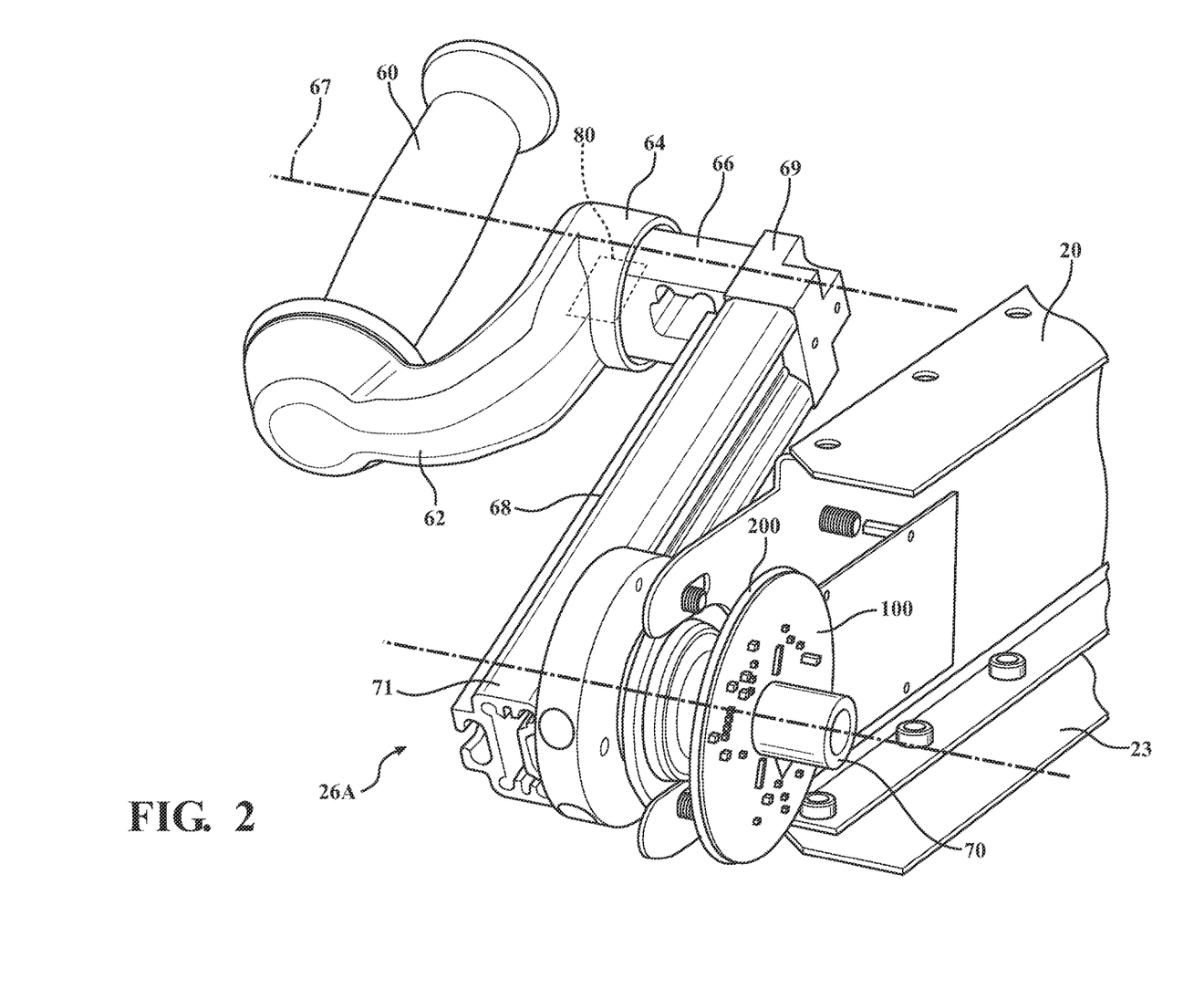
FIG. 2 illustrates a more detailed view of the system for providing communication and power capabilities to the rotating circuit board.

Referring to FIG. 2, a more detailed view of the first crank arm assembly 26A is shown. It should be understood that any description provided regarding the first crank arm assembly 26A is equally applicable to the second crank arm assembly 26B. In this example, the first crank arm assembly 26A is shown relative to a support beam 25 that may be housing within the control assembly 20 of FIG. 1. The first crank arm assembly 26A includes a grip 60. The grip 60 may be coupled to an arched member 62 that has a terminal end 64. The terminal end 64 of the arched member 62 may be rotatably coupled to a first member 66. As such, the grip 60 and the arched member 62 can rotate freely about an axis 67 defined by the length of the first member 66.

One end 69 of the first member 66, generally located opposite the terminal end 64, may be connected to a second member 68. The second member 68 includes an end 71 attached to an axle 70 that rotates about and defines the axis 23. The axle 70 may be in mechanical communication with the chain 50 of FIG. 1, which, via one or more flywheels 52 and transmission mechanisms 54, is in mechanical communication with the resistance mechanism 56. As the user 12 engages the grip 60 of the first crank arm assembly 26A and causes the first crank arm assembly 26A to rotate about the axis 23, resistance is provided to the first crank arm assembly 26A from the resistance mechanism 46 via the axle 70 and other components, such as the one or more flywheels 52 and transmission mechanisms 54.

A fixed circuit board 100 and a rotating circuit board 200 are located adjacent to the support beam 25. In this example, the fixed circuit board 100 is connected to the support beam 25. However, the rotating circuit board 200 is connected to the axle 70. When the axle 70 rotates about the axis 23, the rotating circuit board 200 also rotates about the axis 23, while the fixed circuit board 100 remains stationary.

In one example, the axle 70 may be a tube that allows sensor cables to run from both ends of the axle 70 past the bearings and framework to connect with the rotating circuit board 200 without interference. This arrangement enables a single wireless link to manage sensors on either end of the axle 70 in addition to sensors potentially located on the rotating board itself, such as gyroscopes, accelerometers and/or inertial measurement units.

Generally, the fixed circuit board 100 and/or the rotating circuit board 200 are circuit boards that allow the mounting and/or embedding of one or more electrical components. As such, the fixed circuit board 100 and/or the rotating circuit board 200 may mechanically support and electrically connect electrical or electronic components using conductive tracks, pads and other features etched from one or more sheet layers of copper laminated onto and/or between sheet layers of a non-conductive substrate. The fixed circuit board 100 and/or the rotating circuit board 200 may be single-sided (single conductive layer), double-sided (two conductive layers on both sides of one substrate layer), or multi-layer (outer and inner layers of copper, alternating with layers of the substrate).

Figure 3:
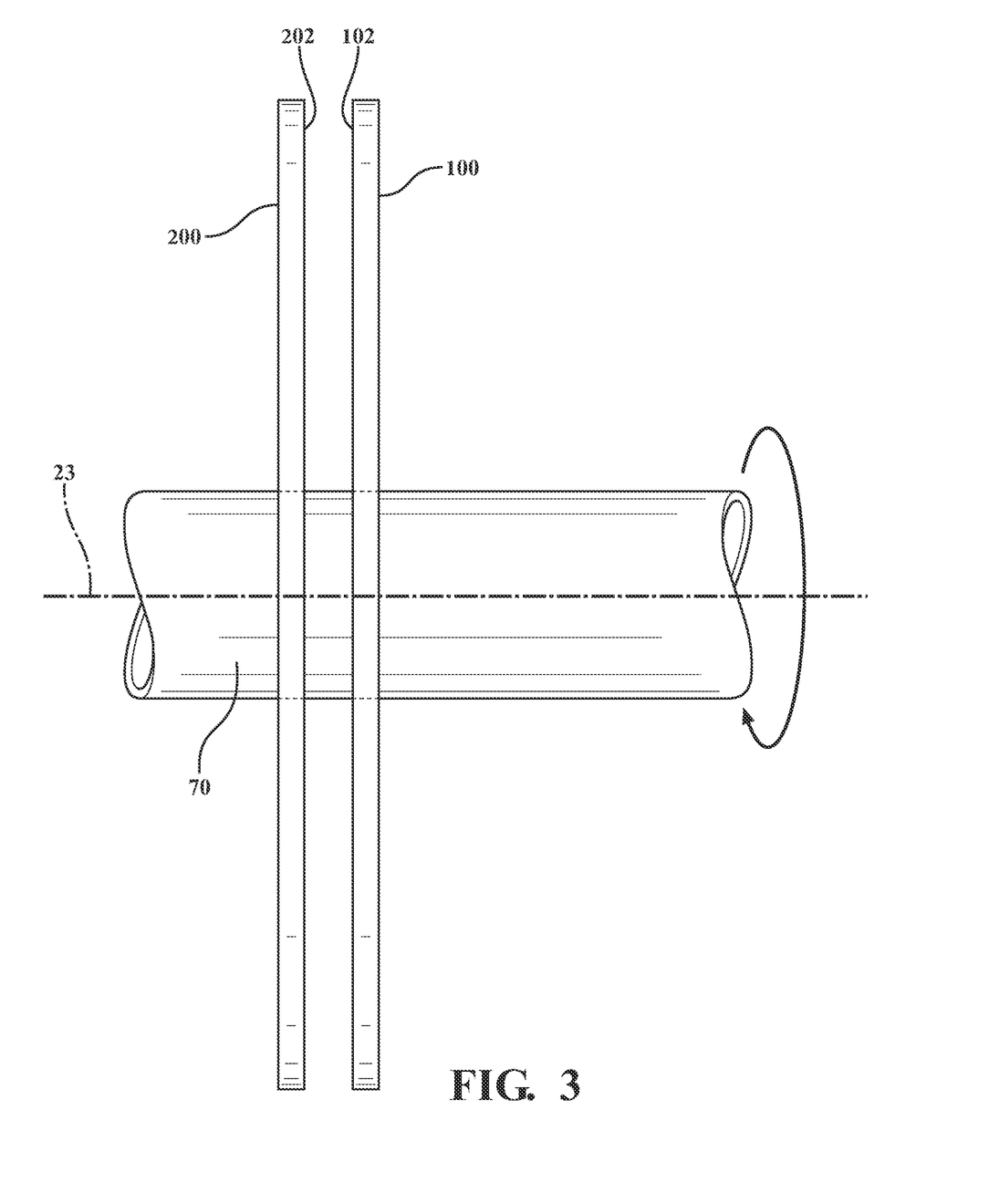
FIG. 3 illustrates a view of an axle extending through both a rotating circuit board and a fixed circuit board that forms the system for providing communication and power capabilities to the rotating circuit board.

FIG. 3 illustrates a side view detailing the fixed circuit board 100, the rotating circuit board 200, and the axle 70. Here, the axle 70 extends through both the fixed circuit board 100 and the rotating circuit board 200. However, as stated previously, the rotating circuit board 200 is connected to the axle 70, while the fixed circuit board 100 is not. In one example, the fixed circuit board 100 may be connected to the support beam 25. As such, when the axle 70 rotates about the axis 23, the rotating circuit board 200 also rotates, while the fixed circuit board 100 stays stationary.

Generally, the fixed circuit board 100 and the rotating circuit board 200 each have surfaces 102 and 202, respectively, which substantially define planes. The planes defined by the surfaces 102 and 202 of the fixed circuit board 100 and the rotating circuit board 200 are generally arranged such that they are parallel to each other and may be perpendicular to the axis 23 of the axle 70. The fixed circuit board 100 and the rotating circuit board 200 are generally located close to each other, separated only by a few millimeters—generally less than 5 mm. As will be explained later, power and communication capabilities are provided from the fixed circuit board 100 to the rotating circuit board 200 by inductive coupling. As such, the fixed circuit board 100 can power any components that are electrically connected to the rotating circuit board 200 and communicate with any of these components as well.

Referring back to FIG. 2, located within the arched member 62 may be a sensor 80. The sensor 80 may measure anyone of several different forces acting upon the grip 60. As such, the sensor 80 may be any one of a number of different sensors, such as a strain sensor, accelerometer, deformation sensor, and the like. Additionally, the sensor 80 may also be a sensor that measures other variables and not just forces acting upon the grip 60. For example, the sensor 80, if located within and/or adjacent to the grip 60, could measure the biometrics of a user when a hand of the user engages the grip 60. As such, the sensor 80 could be a heart rate sensor, blood oxygen sensor, temperature sensor, and the like.

It should be understood the examples regarding the sensor 80 given above are just examples. Furthermore, the sensor 80 may not be a single sensor but may be multiple sensors. As such, the sensor 80 could include a strain sensor, accelerometer, gyroscope, and a temperature sensor. The sensor 80 may be in electrical communication with the rotating circuit board 200. In one example, the sensor 80 may have a wired connection from the sensor 80 to the rotating circuit board 200. One or more wires or traces may be located between the sensor 80 and the rotating circuit board 200.

Additionally, the sensor 80 may include sensors located on the rotating circuit board 200. For example, the rotating circuit board may include a gyroscope, accelerometer, and/or inertial measurement unit that measures the movement and are forces acting upon the rotating circuit board 200.

Figure 4:
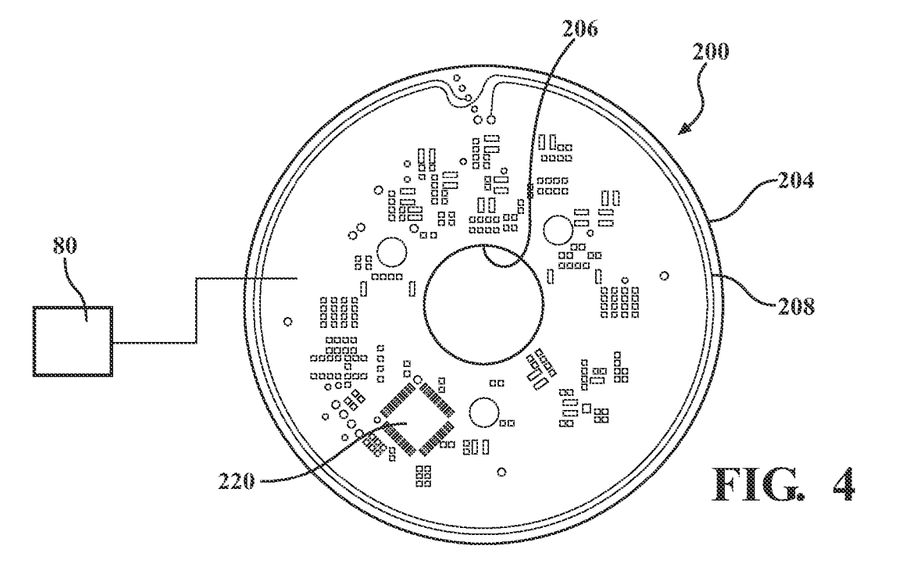
FIG. 4 illustrates a more detailed view of the rotating circuit board.
Figure 5:
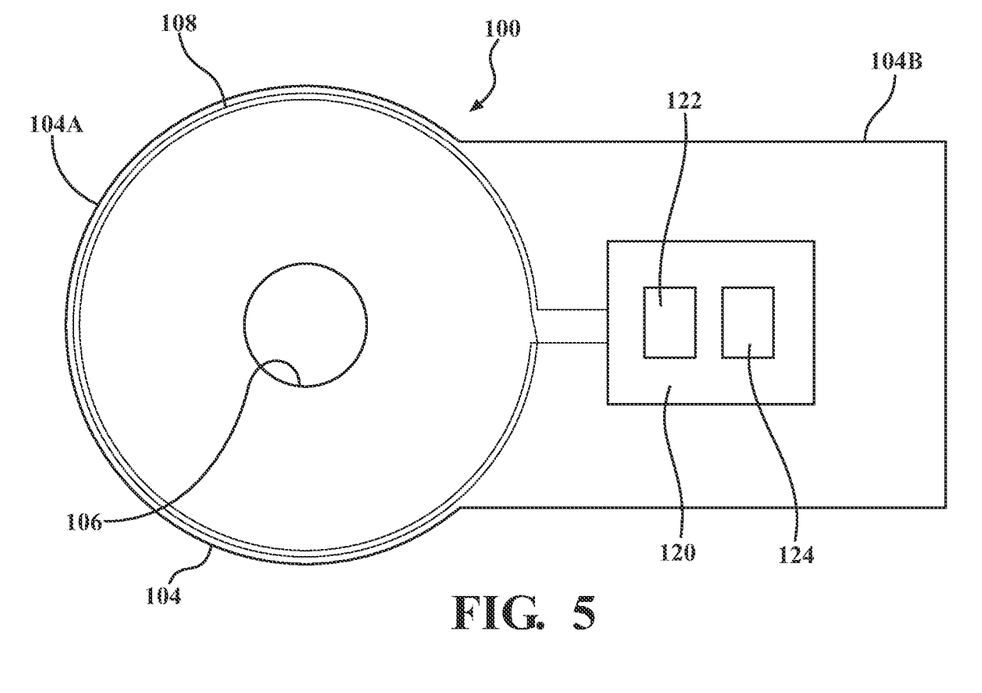
FIG. 5 illustrates a more detailed view of the fixed circuit board.

Referring to FIGS. 4 and 5, more detailed views of the rotating circuit board 200 and the fixed circuit board 100 are shown, respectively. Here, the rotating circuit board 200 may be circular in shape and have a circular outer perimeter 204 and a circular inner perimeter 206. The circular inner perimeter 206 may be connected to the axle 70, which may also extend through the rotating circuit board 200. Located near the circular outer perimeter 204 may be a secondary coil 208. The secondary coil 208 is a coil used to provide inductive coupling between the fixed circuit board 100 and the rotating circuit board 200. Generally, the secondary coil 208 hugs the circular outer perimeter 204 and is therefore substantially circular as well. The secondary coil 208 may be embedded within the rotating circuit board 200 and connected to a receiver circuit 220.

Referring to FIG. 5, the fixed circuit board 100 includes an outer perimeter 104. The outer perimeter 104 includes a circular portion 104A and a rectangular portion 104B. The circular portion 104A of the outer perimeter 104 generally has a curvature that matches the curvature of the circular outer perimeter 204 of the rotating circuit board 200. Located within the circular portion 104A of the outer perimeter 104 is a circular inner perimeter 106. The circular inner perimeter 106 allows the axle 70 to pass through the fixed circuit board 100 and allows the axle 70 to rotate freely. As stated previously, the fixed circuit board 100 is not connected to the axle 70 and stays stationary as the axle 70 rotates.

The fixed circuit board 100 also includes a primary coil 108 that is generally located adjacent to the circular portion 104A of the outer perimeter 104 and is embedded within the fixed circuit board 100. The primary coil 108 generally has a curvature that matches the curvature of the secondary coil 208 of the rotating circuit board 200. As such, when assembled, the rotating circuit board 200 is essentially laid on top of the circle defined by the circular portion 104A of the outer perimeter 104. By so doing, the primary coil 108 of the fixed circuit board 100 can be close enough to the secondary coil 208 of the rotating circuit board 200 such that they may be inductively coupled to one another. By so doing, power can be provided from the fixed circuit board 100 to the rotating circuit board 200 to power components that are electrically connected to the rotating circuit board 200, such as the sensor 80. In addition to providing power, communication capabilities can also be provided between the fixed circuit board 100 and the rotating circuit board 200 and any components connected to the rotating circuit board 200, such as the sensor 80.

The fixed circuit board 100 may include a control system 120 that includes a data filter 122 and a capacitor 124. In one arrangement, the primary coil 108 may be connected in series to the data filter 122 and the capacitor 124, with the data filter 122 being between the primary coil 108 in the capacitor 124.

As stated previously, when properly arranged as described, the fixed circuit board 100 can provide power and communicate with the rotating circuit board 200 via inductive coupling. Regarding providing power from the fixed circuit board 100 to the rotating circuit board 200, the control system 120 of the fixed circuit board 100 may generate a time-varying electromagnetic field, which transmits power across from the primary coil 108 to the secondary coil 208. The receiver circuit 220 of the rotating circuit board 200 extracts power from the field and supplies it to an electrical load, such as the sensor 80 and associated signal conditioning circuitry.

With regards to providing communication capabilities, any one of a number of different methodologies may be utilized. For example, the inductive link created between the fixed circuit board 100 and the rotating circuit board 200 using the primary coil 108 and the secondary coil 208 for power transfer may also be utilized as an antenna for data transmission, where the data is directly modulated on the power carrier by frequency shifting keying in forward data transmission, and the load-shift keying technique is adopted to achieve backward data transmission. Examples of arrangements where both power and data are provided via inductive coupling are described in U.S. Pat. Nos. 7,271,677 and 10,439,449, the contents of both are herein incorporated by reference in their entirety.

Figure 6:
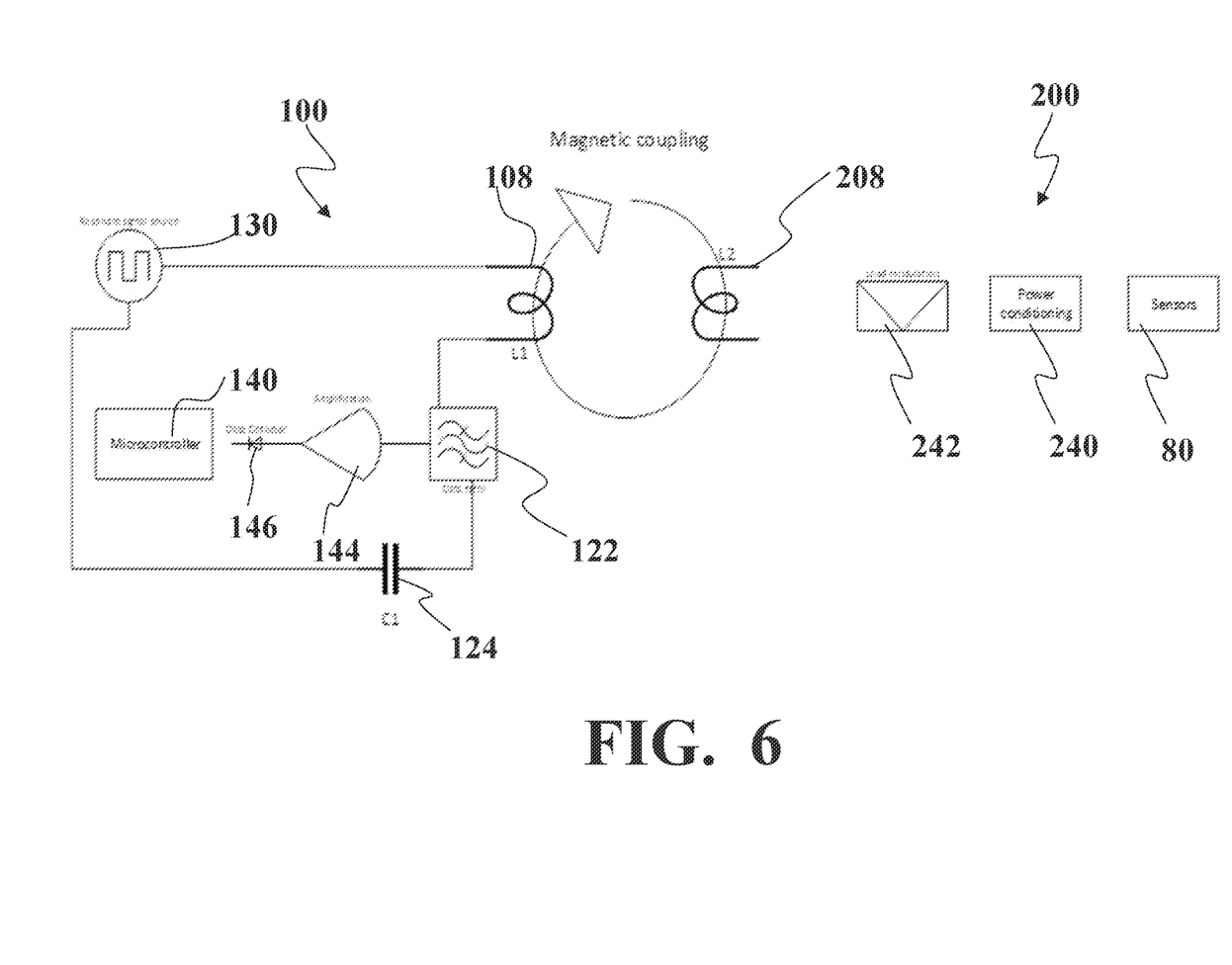
FIG. 6 illustrates a circuit diagram illustrating the primary components forming the inductive link between the fixed circuit board and the rotating circuit board.

In one example of the inductive link between the fixed circuit board 100 and the rotating circuit board 200, reference is made to FIG. 6, which illustrates a circuit diagram illustrating the primary components forming the inductive link. Moreover, as stated previously, the fixed circuit board 100 includes a primary coil 108, a data filter 122, and a capacitor 124 connected in series, wherein the data filter 122 is located between the primary coil 108 and the capacitor 124.

In addition, the fixed circuit board 100 includes a resonant signal source 130 for generating a resonant signal. The fixed circuit board 100 may also include a microcontroller 140 that receives information from the data filter 122. Information received from the data filter 122 may be amplified by an amplifier 144 and provided to the microcontroller via a data detector 146. With regards to the rotating circuit board 200, this rotating circuit board 200 may include the secondary coil 208. The rotating circuit board 200 may also include power conditioning, a load modulation circuit 242 in one or more sensors 80.

A modulation scheme can be employed that positions the data sent by the rotating circuit board 200 such that the window of valid data both sent and detected by the fixed circuit board 100 is a fixed constant phase in relation to the resonating waveform of magnetic flux and associated currents in the inductive loops. This position can be any phase from 0° to 359° but is in synchronous lock with the resonating loop current. The width of the window can be any pulse width contained in the period of the sinewave but is fixed in any application. This allows for a high data rate due to the unique way data is transferred across this link. The modulation scheme sends the serial data from the rotating circuit board 200 to the fixed circuit board 100 at a constant phase synchronous to the resonant frequency of the tuned LC circuit.

It should be appreciated that any of the systems described in this specification can be configured in various arrangements with separate integrated circuits and/or chips. The circuits are connected via connection paths to provide for communicating signals between the separate circuits. While separate integrated circuits are discussed, the circuits may be integrated into a common integrated circuit board in various embodiments. Additionally, the integrated circuits may be combined into fewer integrated circuits or divided into more integrated circuits.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations.

The systems, components, and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A combination of hardware and software can be a processing system with computer-usable program code that, when being loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements can also be embedded in an application product that comprises all the features enabling the implementation of the methods described herein and, when loaded in a processing system, can carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Examples of such a computer-readable medium may include, but are not limited to, a floppy disk, a flexible disk, a hard disk, a magnetic tape, other magnetic medium, an ASIC, a graphics processing unit (GPU), a CD, other optical medium, a RAM, a ROM, a memory chip or card, a memory stick, and other media from which a computer, a processor or other electronic device can read. In the context of this document, a computer-readable storage medium may be any tangible medium that can contain or store a program for use by or in connection with an instruction execution system, apparatus, or device.

The following includes definitions of selected terms employed herein. The definitions include various examples and/or forms of components that fall within the scope of a term and may be used for various implementations. The examples are not intended to be limiting. Both singular and plural forms of terms may be within the definitions.

References to "one embodiment," "an embodiment," "one example," "an example," and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system comprising:
   a fixed circuit board having a primary coil, wherein the fixed circuit board includes an inductive coupling circuit having the primary coil, a data filter, and a capacitor, wherein the data filter is electrically connected to and between the capacitor and the primary coil;
   a rotatable circuit board having a secondary coil;
   an axle extending through the fixed circuit board and the rotatable circuit board, the axle being connected to the rotatable circuit board, wherein the rotatable circuit board rotates about an axis defined by the axle when the axle rotates;
   a sensor being in communication with the secondary coil of the rotatable circuit board, wherein the sensor is located remotely from the rotating circuit board and is configured to rotate about the axis defined by the axle when the axle rotates;
   a wired connection between the sensor and the rotating circuit board;
   the primary coil of the fixed circuit board being inductively coupled to the secondary coil, wherein the primary coil provides power and receives data from the sensor when inductively coupled to the secondary coil; and
   wherein the inductive coupling circuit utilizes a modulation scheme such that a window of valid data sent by the rotating circuit board is a fixed constant phase in relation to power generated from the fixed circuit board, wherein a width of the window is based on a presence of a pulse contained in a period of a sinewave allowing serial data to be sent from the rotating circuit board to the fixed circuit board at a constant phase.

2. The system of claim 1, wherein the fixed circuit board is mounted to a fixed structure.

3. The system of claim 1, wherein the fixed circuit board does not rotate about an axis defined by the axle when the axle rotates.

4. The system of claim 1, wherein the sensor is one or more of: a strain sensor, temperature sensor, position sensor, accelerometer, gyroscope, and an inertial measurement unit.

5. The system of claim 1, further comprising:
   a first grip connected to a first end of the axle;
   a second grip connected to a second end of the axle; and
   wherein the sensor includes a first sensor adjacent to the first grip and a second sensor adjacent to the second grip.

6. The system of claim 5, wherein the first sensor is configured to measure a first force acting on the first grip and the second sensor is configured to measure a second force acting on the second grip.

7. The system of claim 1, wherein the rotatable circuit board has a circular perimeter.

8. The system of claim 7, wherein a portion of the secondary coil is embedded within the rotatable circuit board and is adjacent to the circular perimeter.

9. The system of claim 7, wherein a perimeter of the fixed circuit board includes a rounded portion.

10. The system of claim 9, wherein a portion of the primary coil is embedded within the fixed circuit board and is adjacent to the rounded portion.

11. The system of claim 9, wherein a curvature of the circular perimeter of the rotatable circuit board substantially matches a curvature of the rounded portion of the fixed circuit board.

12. The system of claim 1, wherein the fixed circuit board and the rotatable circuit board are parallel to each other.

13. The system of claim 12, wherein an axis defined by the axle is perpendicular to planes defined by the fixed circuit board and the rotatable circuit board.

14. The system of claim 1, wherein a position of the rotating circuit board with respect to the fixed circuit board can be any phase from 0° to 359° but is in a synchronous lock with a resonating loop current.

15. A system comprising:
   a fixed circuit board having a primary coil, wherein the fixed circuit board includes an inductive coupling circuit having the primary coil, a data filter, and a capacitor, wherein the data filter is electrically connected to and between the capacitor and the primary coil;
   a rotatable circuit board having a secondary coil, the rotatable circuit board has a circular perimeter and a portion of the secondary coil is embedded within the rotatable circuit board and is adjacent to the circular perimeter, the rotatable circuit being configured to rotate about an axis;
   a sensor being in communication with the secondary coil of the rotatable circuit board, wherein the sensor is located remotely from the rotating circuit board and is configured to rotate about the axis;
   a wired connection between the sensor and the rotating circuit board;
   the primary coil of the fixed circuit board being inductively coupled to the secondary coil, wherein the primary coil provides power and receives data from the sensor when inductively coupled to the secondary coil; and
   wherein the inductive coupling circuit utilizes a modulation scheme such that a window of valid data sent by the rotating circuit board is a fixed constant phase in relation to power generated from the fixed circuit board, wherein a width of the window is based on a presence of a pulse of contained in a period of a sinewave allowing serial data to be sent from the rotating circuit board to the fixed circuit board at a constant phase.

16. The system of claim 15, wherein a perimeter of the fixed circuit board includes a rounded portion.

17. The system of claim 16, wherein a portion of the primary coil is embedded within the fixed circuit board and is adjacent to the rounded portion.

18. The system of claim 16, wherein a curvature of the circular perimeter of the rotatable circuit board matches a curvature of the rounded portion of the fixed circuit board.

19. The system of claim 15, wherein the fixed circuit board and the rotatable circuit board are parallel to each other.

20. The system of claim 15, wherein a position of the rotating circuit board with respect to the fixed circuit board can be any phase from 0° to 359° but is in a synchronous lock with a resonating loop current.

\* \* \* \* \*